(12) United States Patent
Coronado et al.

(10) Patent No.: US 9,043,914 B2
(45) Date of Patent: May 26, 2015

(54) FILE SCANNING

(75) Inventors: Juan A. Coronado, Tucson, AZ (US);
Sara M. Coronado, Tucson, AZ (US);
Christina A. Lara, Tucson, AZ (US);
Lisa R. Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/592,057

(22) Filed: Aug. 22, 2012

(65) Prior Publication Data

US 2014/0059687 A1  Feb. 27, 2014

(51) Int. Cl.
*H04L 29/06* (2006.01)
*G06F 21/56* (2013.01)

(52) U.S. Cl.
CPC ............ *G06F 21/562* (2013.01); *G06F 21/567* (2013.01)

(58) Field of Classification Search
USPC .......................................................... 726/24
See application file for complete search history.

(56) References Cited

U.S. PATENT DOCUMENTS

| | | | |
|---|---|---|---|
| 6,594,674 B1 * | 7/2003 | Kaplan et al. .......................... 1/1 | |
| 6,735,700 B1 | 5/2004 | Flint et al. | |
| 6,748,534 B1 | 6/2004 | Gryaznov et al. | |
| 7,243,373 B2 | 7/2007 | Muttik et al. | |
| 7,624,444 B2 | 11/2009 | Gupta et al. | |
| 8,176,526 B1 | 5/2012 | Yang et al. | |
| 8,402,226 B1 * | 3/2013 | Faibish et al. .................. 711/143 | |
| 2002/0016959 A1 | 2/2002 | Barton et al. | |
| 2002/0078142 A1 | 6/2002 | Moore et al. | |
| 2002/0100036 A1 | 7/2002 | Moshir et al. | |
| 2002/0116639 A1 | 8/2002 | Chefalas et al. | |
| 2002/0138760 A1 | 9/2002 | Naitoh | |
| 2002/0147915 A1 | 10/2002 | Chefalas et al. | |
| 2003/0023864 A1 * | 1/2003 | Muttik et al. .................. 713/200 | |
| 2003/0126244 A1 * | 7/2003 | Smith et al. .................... 709/223 | |
| 2004/0078599 A1 | 4/2004 | Nahum | |
| 2005/0283640 A1 | 12/2005 | Cheston et al. | |
| 2006/0185015 A1 | 8/2006 | Cheston et al. | |
| 2007/0180226 A1 | 8/2007 | Schory et al. | |
| 2008/0046552 A1 | 2/2008 | Watson et al. | |
| 2008/0196104 A1 | 8/2008 | Tuvell et al. | |
| 2008/0320156 A1 * | 12/2008 | Chen et al. ..................... 709/230 | |
| 2009/0019137 A1 | 1/2009 | Mishra et al. | |
| 2009/0019544 A1 | 1/2009 | Suffern et al. | |
| 2009/0089880 A1 | 4/2009 | Kobayashi et al. | |
| 2009/0119681 A1 | 5/2009 | Bhogal et al. | |
| 2010/0077481 A1 | 3/2010 | Polyakov et al. | |
| 2010/0262584 A1 | 10/2010 | Turbin et al. | |
| 2011/0016529 A1 | 1/2011 | Kakie | |
| 2011/0173490 A1 | 7/2011 | Narayanaswamy et al. | |
| 2011/0197279 A1 | 8/2011 | Ueoka | |
| 2011/0302655 A1 * | 12/2011 | Tikkanen et al. ................ 726/24 | |
| 2012/0102569 A1 | 4/2012 | Turbin | |
| 2014/0067988 A1 * | 3/2014 | Noronha et al. ............. 709/213 | |
| 2014/0289257 A1 * | 9/2014 | Cain et al. ..................... 707/741 | |

OTHER PUBLICATIONS

Chen, Bo, et al. "Remote data checking for network coding-based distributed storage systems." Proceedings of the 2010 ACM workshop on Cloud computing security workshop. ACM, 2010.*

(Continued)

*Primary Examiner* — Harris Wang
(74) *Attorney, Agent, or Firm* — Kunzler Law Group

(57) ABSTRACT

For file scanning, a division module divides a file into plurality of subfiles. An access module maintains a status of each subfile and scans each subfile with a separate server.

15 Claims, 6 Drawing Sheets

(56) References Cited

OTHER PUBLICATIONS

"Design and development of a new scanning core engine for malware detection" Communications (APCC), 2012 18th Asia-Pacific Conference on , Issue Date: Oct. 15-17, 2012 , Written by: Chuan, Lee Ling; Yee, Chan Lee; Ismail, Mahamod; Jumari, Kasmiran.*
13347408 Notice of Allowance dated Mar. 3, 2014.
13347408 Office Action dated Oct. 30, 2013.

* cited by examiner

| Status 230a | Server Identifier 235a | Subfile Address 240a |
|---|---|---|
| Status 230b | Server Identifier 235b | Subfile Address 240b |
| Status 230c | Server Identifier 235c | Subfile Address 240c |
| Status 230d | Server Identifier 235d | Subfile Address 240d |

FILE SCANNING

BACKGROUND

1. Field

The subject matter disclosed herein relates to file scanning and more particularly relates to antivirus file scanning.

2. Description of the Related Art

Files are often scanned for viruses and other malware. Unfortunately, scanning extremely large files can take an inordinate amount of time.

BRIEF SUMMARY

An apparatus for file scanning is disclosed. A computer readable storage medium stores computer readable program code executable by a processor. The computer readable program code includes a division module and an access module. The division module divides a file into plurality of subfiles. The access module maintains a status of each subfile and scans each subfile with a separate server. Methods and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a schematic block diagram illustrating one embodiment of an antivirus control file;

DETAILED DESCRIPTION

Figure 1:
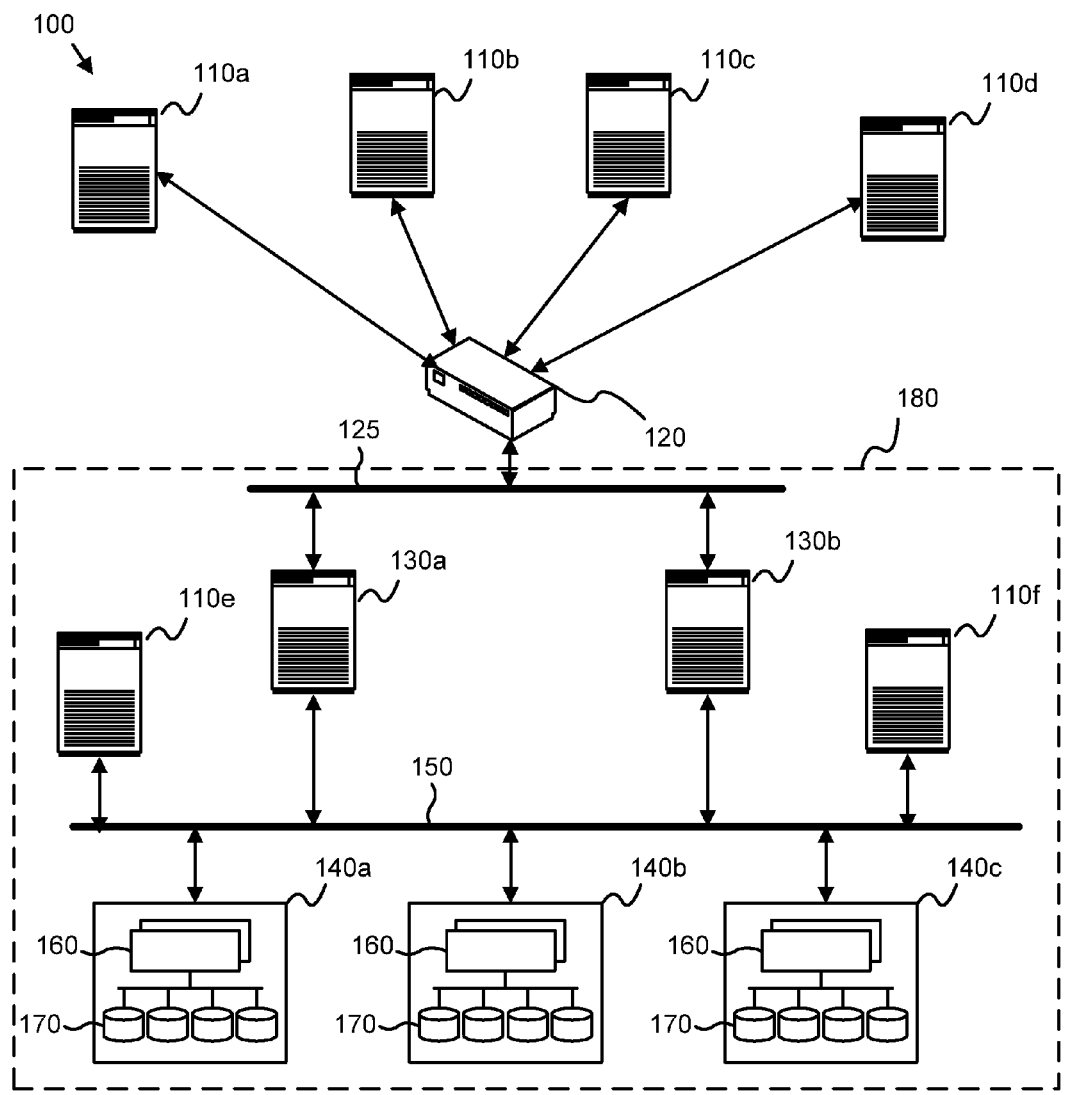
FIG. 1 is a schematic block diagram illustrating one embodiment of a data processing system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system Accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

FIG. 1 is a schematic block diagram illustrating one embodiment of a data processing system 100. The system 100 includes a plurality of servers 110 that may scan files. In addition, the system 100 includes a network 120 and a storage system 180. The network 120 may be the Internet, a router, a wide area network, a local area network, or the like. The Storage System 180 includes a first bus 125, a second bus 150, one or more storage servers 130, and one or more storage subsystems 140. In one embodiment, one or more servers 110 are included in the storage system 180.

Each storage subsystem 140 may include one or more controllers 160 that control one or more storage devices 170. The storage devices 170 may be hard disk drives, optical storage devices, micromechanical storage devices, semiconductor storage devices, and the like. Storage servers 130 may manage and control the storage system 180. The storage servers 130 may communicate with the network 120 and the storage subsystems 140 through the first bus 125 and second bus 150 respectively.

The storage devices 170 may store files, directory information, metadata, and the like, referred to hereafter as files. The servers 110 may scan the files to detect and mitigate any viruses or other malware that may be stored in a file. The servers 110 may be external to the storage system 180 and/or internal to the storage system 180.

Files in the storage system 180 can grow to various sizes; very small to very large file sizes can exist. Scanning such large files with a single server 110 may require an inordinate amount of time. In addition, a large file that is being scanned may be inaccessible during the long scan time. Having a file inaccessible for such a long period of time is not practical for important files. The embodiments described herein divides a file into subfiles to speed the scanning of the file and allow for continued use as will be described hereafter.

Figure 2:
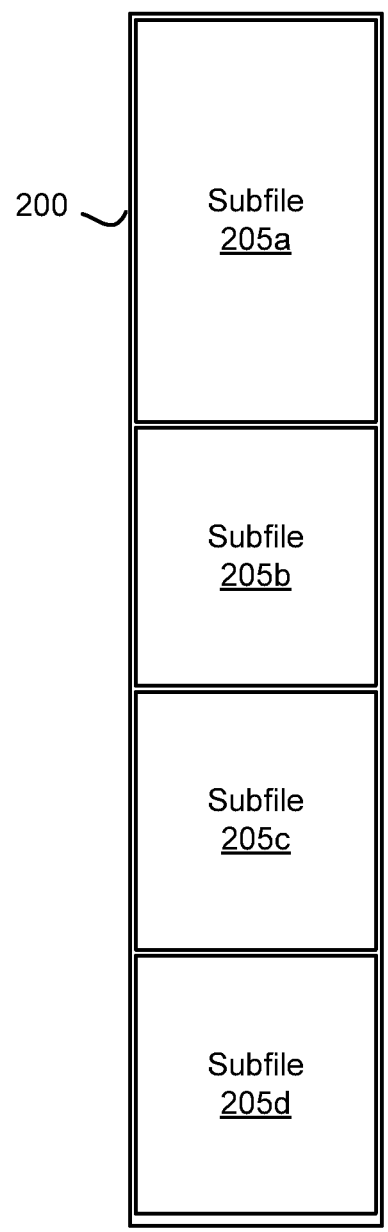
FIG. 2 is a schematic block diagram illustrating one embodiment of a file.

FIG. 2 is a schematic block diagram illustrating one embodiment of a file 200. The file 200 may be stored in the Storage System 180 of FIG. 1. In one embodiment, the file 200 has a size in excess of 1 Terabyte (TB). The file 200 is divided into a plurality of subfiles 205. In one embodiment, each subfile 205 is no larger than a specified size. The specified size may vary in range, such as 1 Megabyte (MB) to 1 Gigabyte (GB). For example, the file 200 may be divided so that each subfile 250 is no larger than the specified size of 10 GB. This subdivision process can be initiated multiple times until the entire file scan has completed.

In one embodiment, the size of each subfile 205 is proportional to a capacity of the server 110 scanning the subfile 205. For example, the starting address of a subfile 205 may be assigned to a server 110. The capacity of the server 110 may be identified. The ending address of the subfile 205 may be selected so the size of the subfile 205 is proportional to the capacity of the server 110 scanning the subfile 205. This subdivision process can be initiated multiple times until each subfile 205 completes scan.

In a certain embodiment, a capacity is determined for each server 110. The size of the subfile 205 created for each server 110 may be a calculated using equation 1, where s is the subfile size, c the capacity of the server 110, and k is a constant. The constant k may be in the range of 2 to 10 GB per 10,000 SPEC SFS2008 as defined by the Standard Performance Evaluation Corporation of Gainsville, Va.

$$s=kc \quad \text{Equation 1}$$

Alternatively, the size of each subfile 205 is proportional to a communications bandwidth to the server 110 scanning the subfile 205. For example, a communications bandwidth may be determined for each server 110. The size of the subfile 205 created for each server 110 may be calculated using equation 2, where s is the subfile size, b the communications bandwidth of the server 110, and m is a constant. The constant m may be in the range of 2 to 10 GB per 1 Megabyte per second throughput.

$$s=mb \quad \text{Equation 2}$$

Alternatively, each subfile 250 comprises related data such as the data between identified headers and/or the data between identified branch instructions. For example, a first subfile 250a may comprise data between table headers in a database.

FIG. 3 is a schematic block diagram illustrating one embodiment of an antivirus control file 320. The antivirus control file 320 includes an entry 220 for each subfile 205. In one embodiment, each entry 220 includes a status 230, a server identifier 235, and a subfile address 240.

The status 230 may be selected from the group consisting of in-queue, quarantined, and cleared statuses. The in-queue status may indicate that a subfile 205 is scheduled to be scanned by a server 110, but has not been found to be clear of viruses or malware. In one embodiment, subfiles 205 within the in-queue status may be accessed. Alternatively, subfiles 205 with the in-queue status may not be accessed. As used herein, accessed refers to a subfile 205 being read from and/or written to buy an application, an operating system, or the like.

The quarantined status may indicate that a virus or other malware has been found in the subfile 205. In one embodiment, subfiles 205 with a quarantined status may not be accessed. Subfiles 205 with the quarantined status may be scheduled for mitigation. The mitigation may include deleting a virus and/or malware from the subfile 205, overwriting the subfile 205 with a backup copy, and rebuilding the subfile 205 using error codes and/or redundant data, and the like.

The cleared status may indicate that the subfile 205 has been scanned and that no viruses or other malware have been found. In one embodiment, subfiles 205 with a cleared status may be accessed. For example, if the first subfile 205a of a large database file 200 has been scanned and has a cleared status, the first subfile 205a may be accessed.

The server identifier 235 may identify the server 110 assigned to scan the subfile 205. In one embodiment, the server identifier 235 is a network address. Alternatively, the server identify 235 may be a logical name.

The subfile address 240 may include a start address and an end address for the subfile 250. In one embodiment, the subfile address 240 includes start addresses and end addresses for a plurality of segments that make up the subfile.

Figure 4:
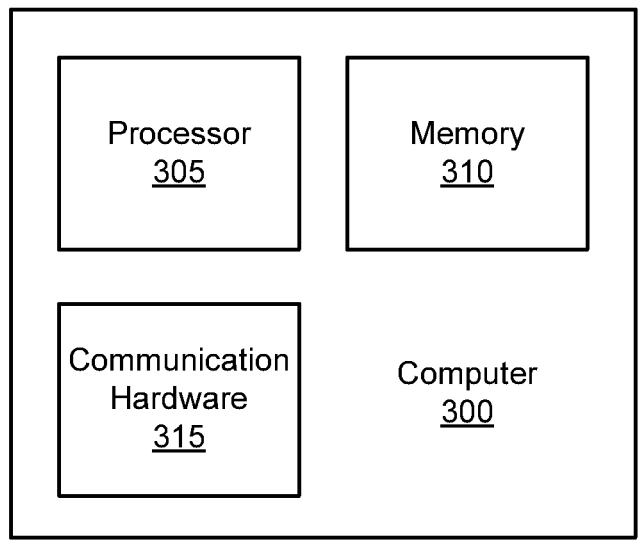
FIG. 4 is a schematic block diagram illustrating one embodiment of a computer.

FIG. 4 is a schematic block diagram illustrating one embodiment of a computer 300. The computer 300 may be the server 110. Alternatively, the computer 300 may be a storage server 130, a controller 160, or the like. The computer 300 may include a processor 305, a memory 310, and communication hardware 315. The memory 310 may be a semiconductor storage device, a hard disk drive, or the combinations thereof. The memory 310 may store computer readable program code. The processor 305 may execute the computer readable program code. The computer 300 may communicate with the external devices through the communication hardware 315.

Figure 5:
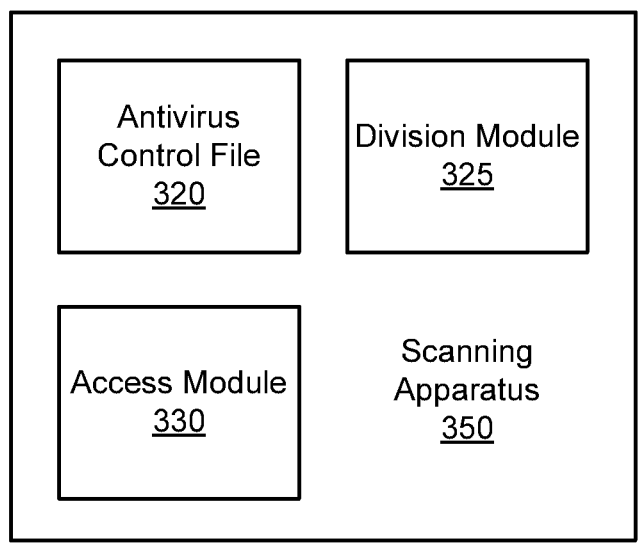
FIG. 5 is a schematic block diagram illustrating one embodiment of a scanning apparatus.

FIG. 5 is a schematic block diagram illustrating one embodiment of a scanning apparatus 350. The scanning apparatus 350 may be embodied in the computer 300. The apparatus 350 includes the antivirus control file 320, a division module 325, and an access module 330. The antivirus control file 320 is the antivirus control file 320 of FIG. 3.

The antivirus control file 320, the division module 325, and the access module 330 may be embodied in a computer-readable storage medium storing computer readable program code. The computer readable storage medium may be the memory 310. The processor 305 may execute the computer readable program code to perform the functions of the antivirus control file 320, the division module 325, and the access module 330.

The division module 325 may divide the file 200 into a plurality of subfiles 205. The access module 230 may maintain a status of each subfile 205. In addition, the access module 230 may scan each subfile 205 with a separate server 110 as will be described hereafter.

Figure 6:
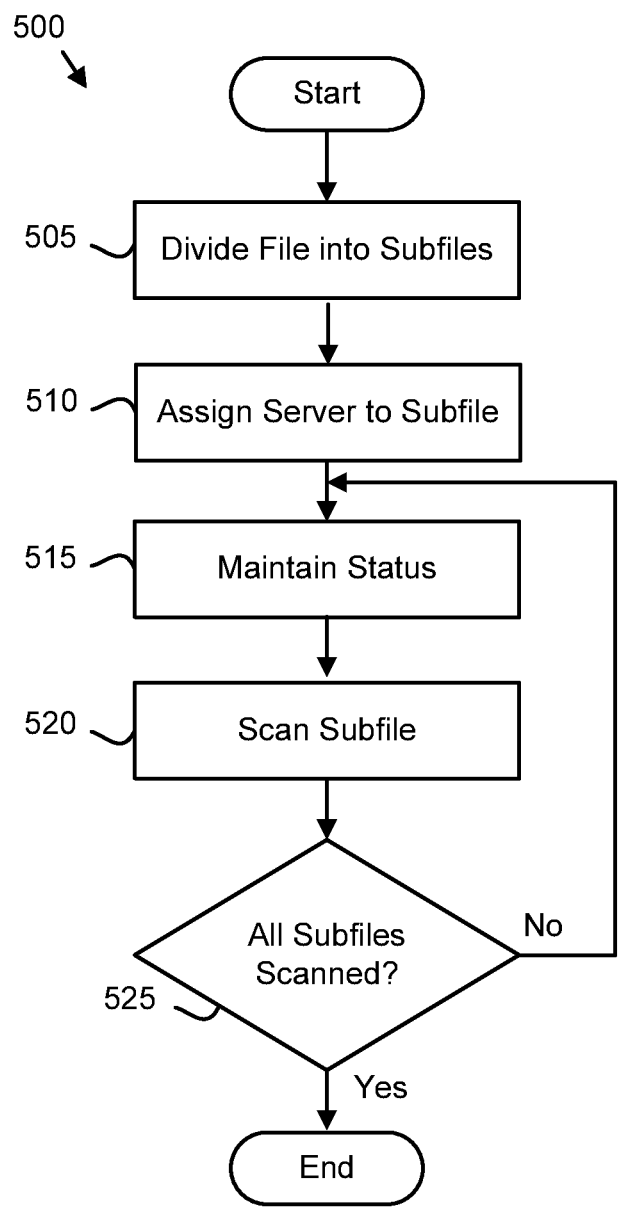
FIG. 6 is a schematic flow chart diagram illustrating one embodiment of a file scanning method.

FIG. 6 is a schematic flow chart diagram illustrating one embodiment of a file scanning method 500. The file scanning method 500 may perform the functions of the scanning apparatus 350. In addition, the file scanning method 500 may be performed by computer readable storage medium storing computer readable program code.

The file scanning method 500 starts, and in one embodiment the division module 325 divides 505 the file 200 into a plurality of subfiles 205. The size of each subfile 205 may be proportional to a capacity of the server 110 scanning the subfile 205. Alternatively, the size of each subfile 205 may be proportional to a communications bandwidth to the server 110 scanning the subfile 205. The division module 325 may divide 505 the subfiles by writing subfile addresses 240 to the antivirus control file 320.

The division module 325 may further assign 510 a separate server 110 to each subfile 205. In one embodiment, the division module 325 records a server identifier 235 of the assigned server 110 in the antivirus control file 320. In addition, the division module 325 may communicate the subfile address 240 and/or the entry 220 for the subfile 205 to the assigned server 110. Alternatively, the subfile address 240 and the entry 220 may be included in a request for the assigned server 110 to scan the subfile 205.

In one embodiment, the division module 325 assigns 510 servers 110 to subfiles 205 to minimize accesses to a storage device 170. For example, only one server 110 may be assigned 510 to scan subfiles 205 that are stored on a specified storage device 170.

The access module 330 may maintain 515 the status 230 of each subfile 205. The status 230 of each subfile 205 may be selected from the group consisting of in-queue, quarantined, and cleared. In one embodiment, the access module 330 initially sets each status 230 to the in-queue status.

In one embodiment, when the server 110 assigned to scan a subfile 205 completes scanning the subfile 205, the access module 330 changes the status 230 of the subfile 205. For example, if the server 110 did not find a virus or malware in the subfile 205, the access module 330 may change the status 230 of the subfile 205 to the cleaned status. Alternatively, if the server 110 finds a virus or malware in the subfile 205, the access module 330 may change the status 230 of the subfile to quarantined.

The access module 330 may scan 520 the subfile 205. In one embodiment, the access module 330 uses the assigned server 110 to scan 520 the subfile 205. The servers 110 may concurrently scan the subfiles 205. Each server 110 may scan one subfile 205 at a time. Alternatively, each server 110 may concurrently scan a plurality of subfiles 205. In a certain embodiment, each server 110 executes a plurality of virtual machines. Each virtual machine may scan concurrently one or more subfiles 205.

In one embodiment, a subfile 205 is not assigned to a server 110 until the server 110 is ready to scan 520 the subfile 205. Alternatively, a portion of the subfiles 205 may be assigned to servers 110 before the servers 110 commence scanning 520 the subfiles 205.

In one embodiment, the access module 330 determines 525 if all subfiles 205 have been scanned. If all subfiles 205 have been scanned, the method 500 ends. If subfiles 205 remain to be scanned, the method 500 loops to maintain status 505 for the subfiles 205.

The method 500 divides 505 a file 200, particularly large files 200, into a plurality of subfiles 205. The subfiles 205 may then be scanned 520 by separate servers 110. Dividing the file 200 allows the file 200 to be scanned more rapidly.

Figure 7:
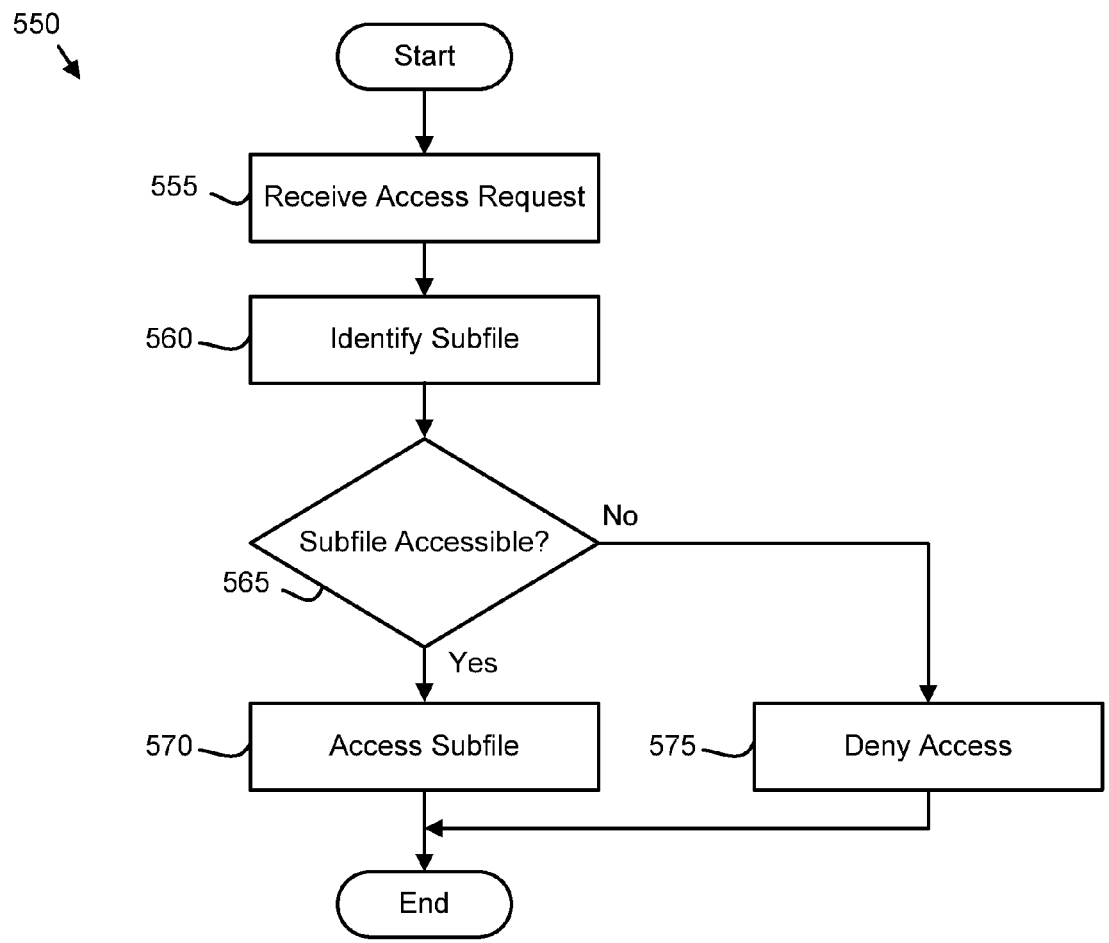
FIG. 7 is a schematic flow chart diagram illustrating one embodiment of an access method.

FIG. 7 is a schematic flow chart diagram illustrating one embodiment of an access method 550. The method 550 may perform the functions of the apparatus 350. In addition, the method 550 may be performed by computer readable storage medium storing computer readable program code.

The method 550 starts, and in one embodiment the access module 330 receives 555 an access request to access an address range and/or address in the file 200. The access request may be received 550 from an operating system, an application, or the like.

The access module 330 identifies 560 the subfile 205 and/or subfiles 205 corresponding to the address range and/or the address. In one embodiment, the access module 330 uses the antivirus control file 320 to identify 560 the subfile 205.

The access module 330 determines 565 if the requested subfile 205 is accessible. In one embodiment, the requested subfile 205 is accessible if the status 230 of the subfile 205 is cleared. In a certain embodiment, the requested subfile 205 is also accessible if the status 230 of the subfile 205 is in-queue. If the requested subfile 205 is accessible, the requesting application or operating system is permitted to access 570 the subfile 205.

If the access module 330 determines 565 that the requested subfile 205 is not accessible, such as if the status 230 of the subfile 205 is quarantined, the access module 330 may not permit 575 access to the requested subfile 205. In one embodiment, the request to access the subfile 205 is stored and granted when the status 230 for the subfile 205 changes to cleared.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a non-transitory computer readable storage medium storing computer readable program code executable by a processor, the computer readable program code comprising:
code that divides a file into plurality of subfiles, wherein a size of each subfile s is calculated as s=mb where b is a communications bandwidth to a server scanning the subfile and m is a constant in the range of 2 to 10 Gigabytes per 1 Megabyte per second throughput; and
code that maintains a status of each subfile and scans each subfile with a separate server, wherein access is permitted to an in-queue subfile prior to a scan of the in-queue subfile, the status of each subfile is selected from the group consisting of in-queue, quarantined, and cleared, wherein the in-queue status indicates a subfile is scheduled to be scanned by the separate server and has not been found clear of malware.

2. The apparatus of claim 1, wherein a size of each subfile is further proportional to a capacity of the server scanning the subfile.

3. An apparatus of claim 1, the code further maintaining a server identifier and a subfile address for each subfile, and wherein the status of each subfile is selected from the group consisting of in-queue, quarantined, and cleared, the quarantined status indicates a subfile is scheduled for mitigation, and the cleared status indicates that a subfile has been scanned and found clear of malware.

4. The apparatus of claim 3, wherein access is permitted to cleared subfiles during the scan.

5. A method for file scanning comprising:
dividing, by use of a processor, a file into a plurality of subfiles;
maintaining a status of each subfile, wherein a size of each subfile s is calculated as s=mb where b is a communications bandwidth to a server scanning the subfile and m is a constant in the range of 2 to 10 Gigabytes per 1 Megabyte per second throughput;
and scanning each subfile with a separate server, wherein access is permitted to an in-queue subfile prior to a scan of the in-queue subfile, the status of each subfile is selected from the group consisting of in-queue, quarantined, and cleared, wherein the in-queue status indicates a subfile is scheduled to be scanned by the separate server and has not been found clear of malware.

6. The method of claim 5, wherein a size of each subfile is further proportional to a capacity of the server scanning the subfile.

7. The method of claim 5, wherein the status of each subfile is selected from the group consisting of in-queue, quarantined, and cleared, the quarantined status indicates a subfile is scheduled for mitigation, and the cleared status indicates that a subfile has been scanned and found clear of malware.

8. The method of claim 7, wherein access is permitted to cleared subfiles during the scan.

9. The method of claim 5, the status further comprising a server identifier and a subfile address for each subfile.

10. An computer program product for file scanning, the computer program product comprising:
  a non-transitory computer readable storage medium having computer readable program code executable embodied therein, the computer readable program code configured to:
  divides a file into plurality of subfiles, wherein a size of each subfile s is calculated as s=mb where b is a communications bandwidth to a server scanning the subfile and m is a constant in the range of 2 to 10 Gigabytes per 1 Megabyte per second throughput; and
  maintain a status of each subfile and scans each subfile with a separate server, wherein access is permitted to an in-queue subfile prior to a scan of the in-queue subfile, the status of each subfile is selected from the group consisting of in-queue, quarantined, and cleared, wherein the in-queue status indicates a subfile is scheduled to be scanned by the separate server and has not been found clear of malware.

11. The computer program product of claim 10, wherein a size of each subfile is further proportional to a capacity of the server scanning the subfile.

12. The computer program product of claim 10, the program code further maintaining a server identifier and a subfile address for each subfile, and wherein the status of each subfile is selected from the group consisting of in-queue, quarantined, and cleared, the quarantined status indicates a subfile is scheduled for mitigation, and the cleared status indicates that a subfile has been scanned and found clear of malware.

13. The computer program product of claim 10, wherein access is permitted to cleared subfiles during the scan.

14. A method for file scanning comprising:
  dividing a file into a plurality of subfiles;
  maintaining a status of each subfile, wherein a size of each subfile s is calculated as s=mb where b is a communications bandwidth to a server scanning the subfile and m is a constant in the range of 2 to 10 Gigabytes per 1 Megabyte per second throughput;
  and scanning each subfile with a separate server, wherein access is permitted to an in-queue subfile prior to a scan of the in-queue subfile, the status of each subfile is selected from the group consisting of in-queue, quarantined, and cleared, wherein the in-queue status indicates a subfile is scheduled to be scanned by the separate server and has not been found clear of malware.

15. The method of claim 14, the code further maintaining a server identifier and a subfile address for each subfile, and wherein the status of each subfile is selected from the group consisting of in-queue, quarantined, and cleared, the quarantined status indicates a subfile is scheduled for mitigation, and the cleared status indicates that a subfile has been scanned and found clear of malware.

* * * * *